Aug. 1, 1939.  B. L. HARTZ  2,168,018
REFRIGERATING DELIVERY VEHICLE
Filed May 1, 1937   3 Sheets-Sheet 1
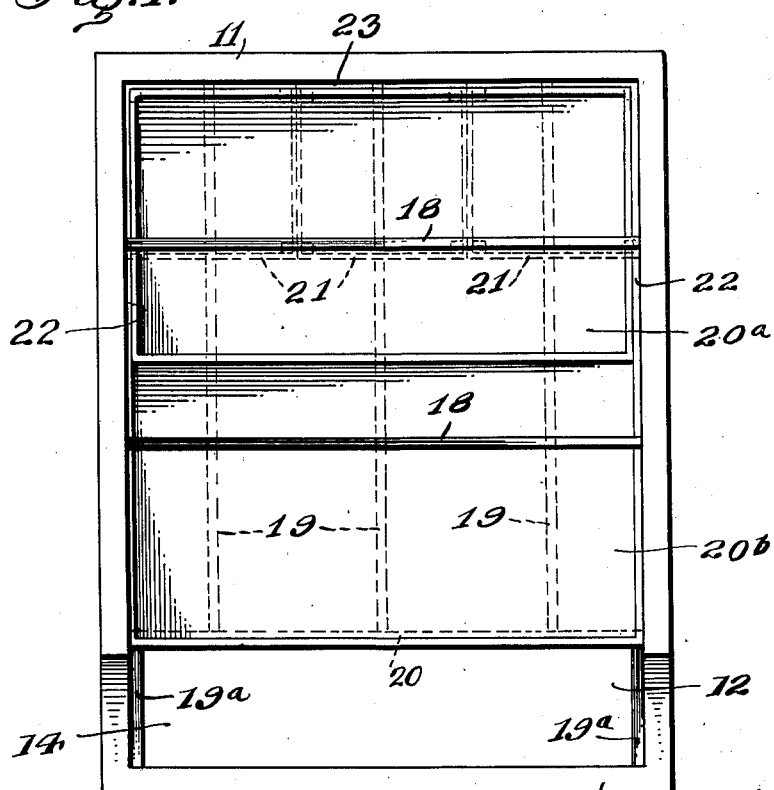
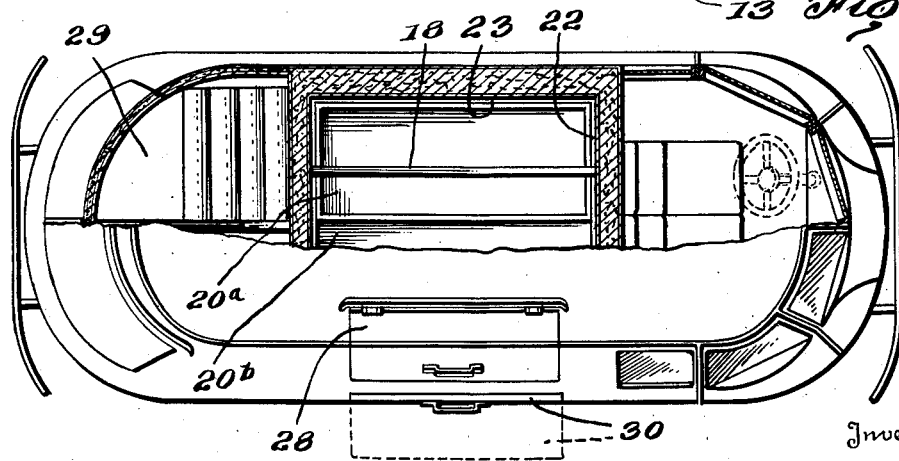
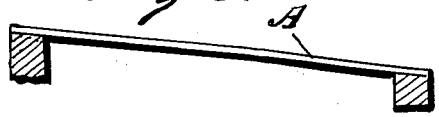

Aug. 1, 1939.  B. L. HARTZ  2,168,018
REFRIGERATING DELIVERY VEHICLE
Filed May 1, 1937   3 Sheets-Sheet 2
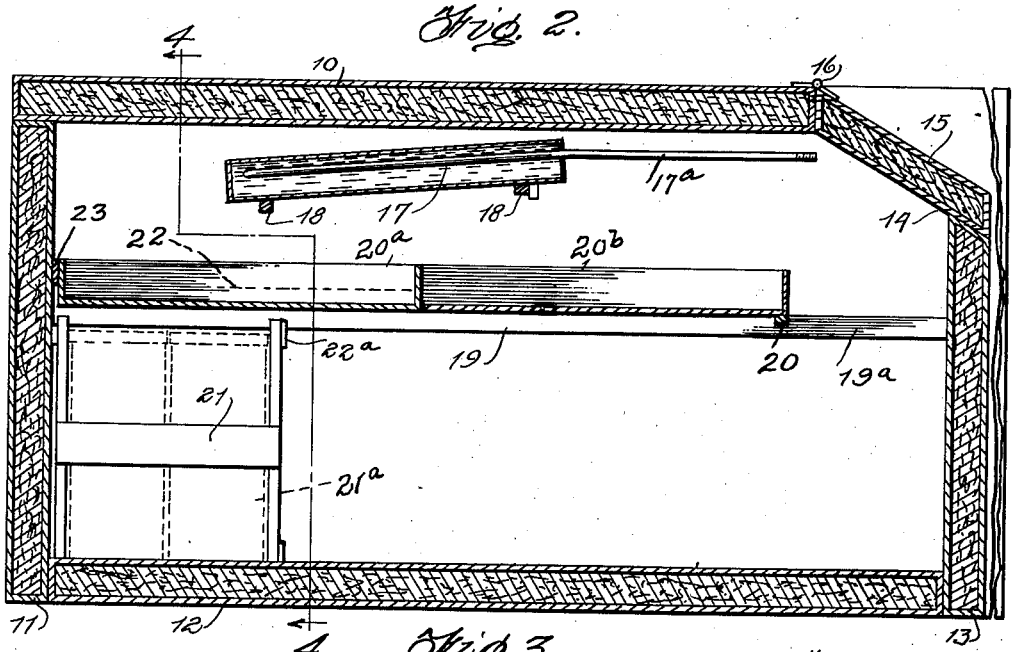
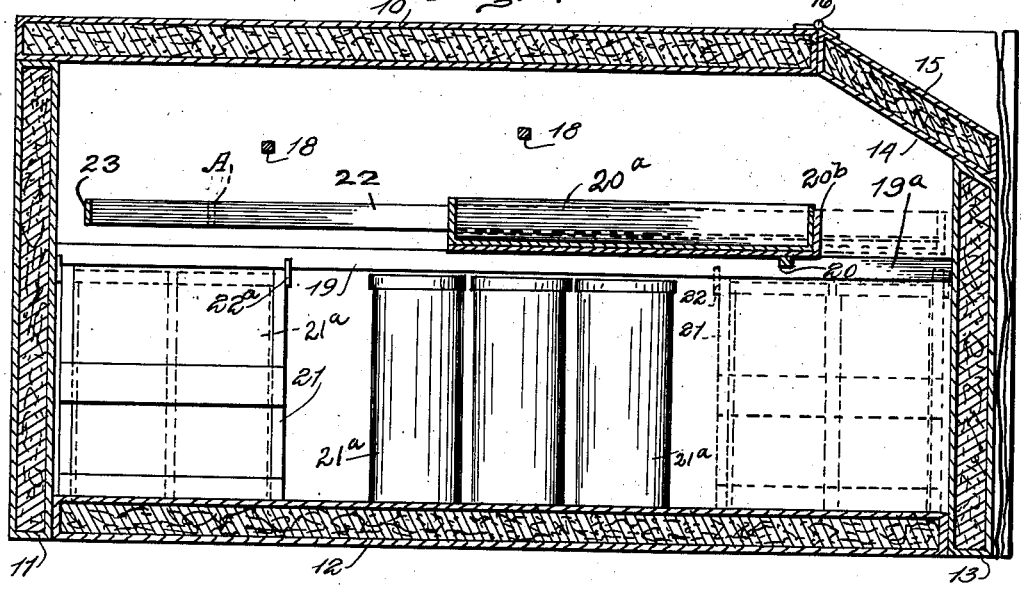
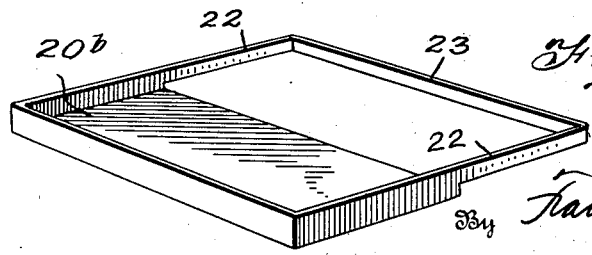

Aug. 1, 1939.          B. L. HARTZ          2,168,018
REFRIGERATING DELIVERY VEHICLE
Filed May 1, 1937          3 Sheets-Sheet 3

Inventor,
Barge L. Hartz,
By Frank S. Appleman,
Attorney.

Patented Aug. 1, 1939

2,168,018

UNITED STATES PATENT OFFICE 2,168,018

REFRIGERATING DELIVERY VEHICLE

Barge L. Hartz, Bethesda, Md.

Application May 1, 1937, Serial No. 140,226

2 Claims. (Cl. 296—24)

This invention relates to transporting and delivery conveyances with special reference to its employment for the distribution or delivery of frozen products that are to be kept at a low temperature while being transported from the factory or main refrigerating plant, and the invention, in the present embodiment, has special reference to its use in delivering ice cream in cans and packages.

An object of this invention is to provide means associated with a delivery truck and preferably adapted for use on motor vehicles that will conserve the refrigerant during the loading of the truck and the removal of the goods therefrom; and it is furthermore an object to provide novel means whereby the goods may be moved with relation to an opening in the top of the refrigerating body so that the lower cold strata remains substantially undisturbed while loading or unloading.

It is a further object of the invention to provide a body of the character indicated in which cans for ice cream may occupy the lowermost zone of the body, supported by the floor thereof, the said cans being moved rearwardly after they have been introduced through the opening in the top of the body, and likewise, when the cans are to be removed, they will be drawn to a position under the said opening.

It is furthermore the purpose of the inventor to provide supports for package goods, such as ice cream, formed into bricks and encased in wrappers or cartons. For this purpose, trays are held on a plane above the cans, and the said trays are slidable rearwardly of the body after they have been loaded. Preferably, the trays may be nested, one within the other, to facilitate their manipulation, that is, one of the series of trays can be pushed rearwardly on suitable supports or guides, leaving the other tray under the opening to be filled and then pushed rearwardly when loaded until it encounters the one previously loaded. The relation of parts is such that the one last loaded when pushed rearwardly clears the space under the opening so that cans may be manipulated, introduced or removed. In this way, the outermost tray can be drawn to a position under the opening for removing the contents thereof, after which the rearmost tray can be moved under the opening and nested in the first mentioned tray and the contents thereof will be accessible.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which—

Figure 1 illustrates a plan view of the interior of a refrigerating body;

Figure 2 illustrates a vertical sectional view thereof;

Figure 3 illustrates a similar view with the parts in different positions;

Figure 6 illustrates a view of a fragment of the body embodying a modification;

Figure 7 illustrates a perspective view of the front tray; and

Figure 8 illustrates a detail view showing a modified structural feature.

Figure 4:
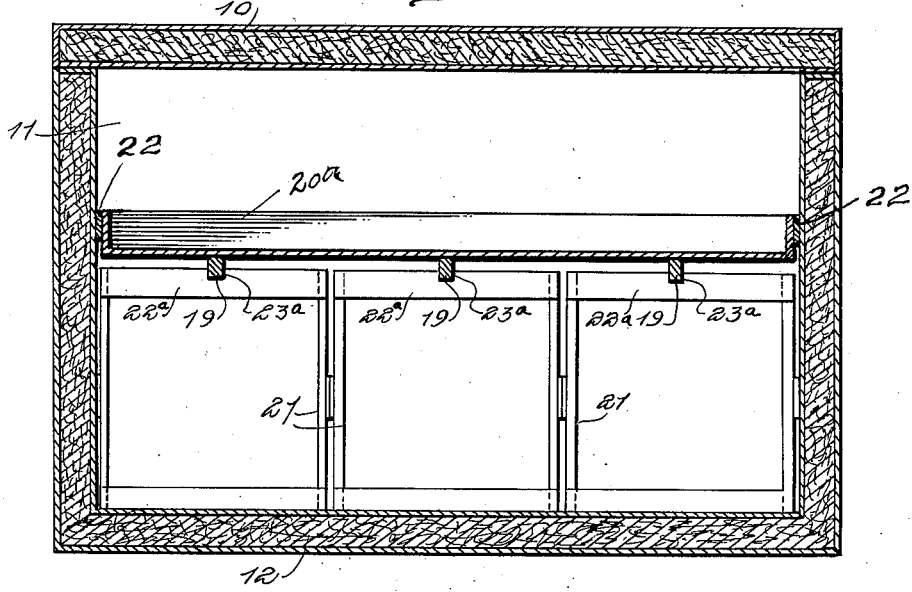
Figure 4 illustrates a vertical sectional view of the body on the line 4—4 of Fig. 2.
Figure 5:
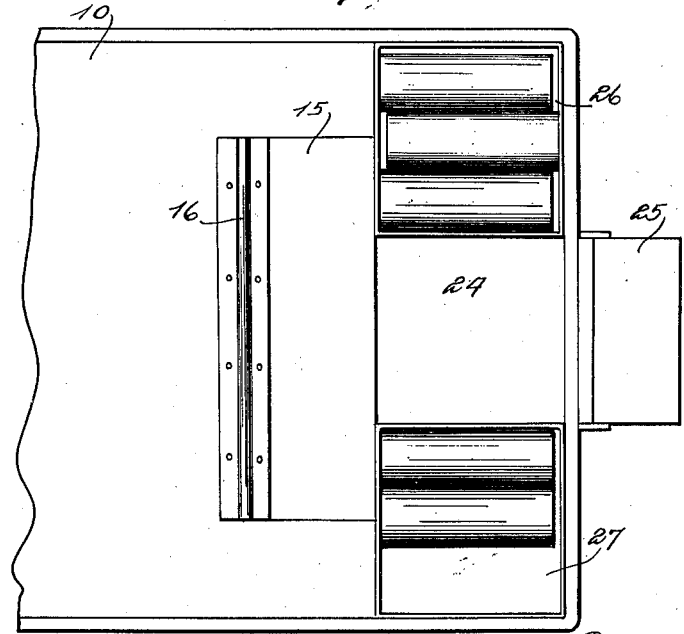
Figure 5 illustrates a plan view of the rear end of the body showing one embodiment of the invention.

In these drawings, 10 denotes the top or cover of the body, 11 the inner end wall, 12 the bottom, and 13 the outer end wall of hollow construction and containing insulation. At the outer end of the body at the top thereof there is an opening 14 closed by a door or cover 15 which is of similar construction to that of the walls containing insulation, and the door 15 is hinged to the cover or top, as shown at 16.

A refrigerating unit 17 of known type is suspended near the top of the body in appropriate manner, as by rails 18, and the said unit is of a type in which the refrigerant may be circulated through a coil 17 from the main refrigerating apparatus of the plant where ice cream is being manufactured, pipes such as 17ª being provided for connection with the plant system. As the details of construction of this unit are not a part of the present invention, it will not be described in detail, but generally, it may be said to be in the nature of a refrigerating unit described and shown in U. S. Patent No. 2,016,377 of October 8, 1935.

The interior of the body is provided with a frame consisting of longitudinally and transversely disposed supports or rails 19 and 20, respectively, and the said rails 19 have the dual function of supporting the trays 20ª, 20ᵇ for sliding movement longitudinally thereof and they also constitute guides for the can crates 21 which are slidable longitudinally of the body after they have been loaded with cans introduced through the aforesaid opening. Cans 21ª may also be introduced through the said opening and supported by the floor without the intervention of crates.

The front tray 20ᵇ has rearwardly extending members 22 which are interposed between the body and the rear tray 20ª, and the rear ends of these members are connected by a cross bar 23 so that the said members 22 and cross bar form a yoke which embraces the rear tray 20ª and communicates motion to it as the front tray 20ᵇ is pulled forwardly under the opening. The trays, of course, are supported by the rails 19 and the function of the yoke is merely to cause the trays to move in unison while one is back of the other in their normal positions, but after the front tray has been moved under the opening, the rear tray is accessible to the operator and can be manipulated by slightly lifting its front end and exerting a pull to bring it into the front tray in position under the said opening. When the rear tray is pushed rearwardly to the end of the front tray, it drops slightly to the level of the bottom of the rear tray and as the front tray is pushed rearwardly, the said rear tray is moved with it and the yoke, and the parts are then returned to the position in which they are shown in Fig. 1.

In Figure 3 the dotted line positions of the two trays are shown when nested and positioned under the opening, and the dotted lines A on said figure show the position of the inner end of the yoke when the trays are under the said opening, and the rear tray may be provided with handles or the like, within reach of the operator at the opening to facilitate manipulation of the said tray and to lift it slightly above the bottom of the outer tray, as is necessary when nesting the trays, and pulling the rear tray into the front tray.

In Figure 3, one of the crates is shown in dotted lines moved to the position which it occupies when cans are being placed in the crate or taken from the crate. It would not, however, be caused to assume the dotted line position while cans are occupying the space in front of the crate in its full line position in said figure.

The crates and cans may be moved with respect to the opening by suitable hand manipulated hooks or implements of sufficient length to engage a crate in the rear of the body.

In assembling the crates with respect to the rails, the upper frame portions 22ª thereof are provided with recesses or slots 23ª into which the rails fit, and the said crates are thereby guided in straight lines as they are moved rearwardly and forwardly in the body.

Extension rails 19ª are on the inside of the body under the opening for supporting the trays when in position under the opening.

The body may be provided with a platform 24 to be used by the operator when loading or unloading and it is also provided with a step 25 for use of the operator. At the sides of the platform, bins 26 and 27 are provided for the reception of empty cans.

In the modification shown in Figure 6, the body is shown as having an opening 28 at the top but on the side edge thereof and, in this form, the cans and packages will be delivered and removed at the side of the vehicle. When a truck is made in accordance with this modified arrangement, the rear bin 29 may extend across the body at the back thereof and it may be partitioned into appropriate compartments for the reception of the empty cans. A side step or runway 30 will be provided and this may be of the well known hinged type to fold against the side of the body, or it can be of the slidable type, fitting in guides or supports under the body in order that it may be extended beyond the body or nested under the body when in use. Since types of runways or steps of this kind are well known in the art, it is believed unnecessary to describe the same in detail.

When the opening is located at the side of the body at the top, the tray supports and crates will be assembled with relation to other parts that are built in the body to permit movement of the cans and trays transversely of the body instead of longitudinally thereof.

From what has been said of the purposes and functions of the device in a general way and of the details of construction and their functions in referring to the parts of the assembly, the operation and use of the invention will be understood by those skilled in the art without further résumé of the operation.

The art of record discloses that the provision of a plurality of superimposed commodity shelves or supports is well known in dispensing vehicles, and it is obvious that instead of only one set of guides and supports for trays or commodities, the body of this delivery vehicle may be of such height as to accommodate duplicate elements for the purpose on different planes.

It may be desirable to construct the body with an inclined bottom higher at the end remote from the opening so that the slanting condition will result in causing the cans to travel toward that end of the body from which the cans are to be removed, this construction being shown in Fig. 8 wherein the floor A of the body is shown inclined.

I claim:

1. In a refrigerating delivery vehicle having a floor including a support for an operator, a body having an opening at one edge at the top thereof through which the body is loaded and unloaded, rail-like guides supported above the floor of the body, crates slidable under the guides and having recesses to receive the lower edges of the guides whereby the said crates are guided as they slide on the floor of the body.

2. In a refrigerating delivery vehicle having a floor including a support for an operator, a body having an opening at one edge at the top thereof through which the body is loaded and unloaded, rail-like guides located above the floor of the body for the support of trays, crates slidable under the guides characterized by an engagement of the crates and guides for holding the crates against movement laterally of the body and slidably retaining the crates for movement on the floor of the body longitudinally of the guides to positions rearwardly of the body or forwardly thereof to positions under the opening of the body.

BARGE L. HARTZ.